July 28, 1959
A. KURTZON
2,897,347
SHALLOW FLUORESCENT LAMP FIXTURE
Filed Aug. 18, 1958
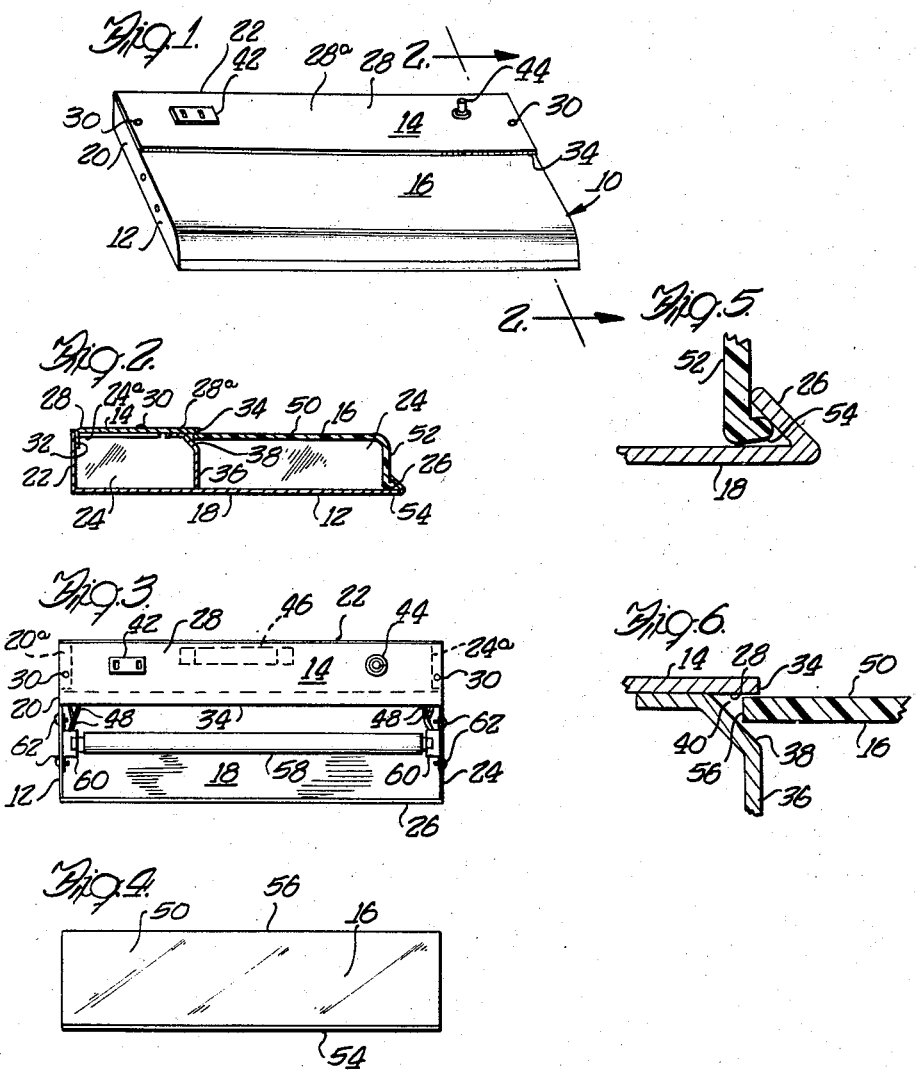
INVENTOR.
Albert Kurtzon
BY George E Frost
Attorney 2,897,347
SHALLOW FLUORESCENT LAMP FIXTURE Albert Kurtzon, Highland Park, Ill.

Application August 18, 1958, Serial No. 755,690

2 Claims. (Cl. 240—51.11)

My invention relates to a self-contained fluorescent lamp fixture which is shallow in depth and especially adapted to house low wattage fluorescent lamps that may readily be replaced.

There is provided, in accordance with the present invention, a shallow, self-contained fluorescent lamp fixture which is adapted to house a fluorescent lamp. The lamp may readily be replaced with a minimum of effort. The fixture has a main housing plate consisting of a roof web with depending skirts on three edges to define three sides of the housing and a shallow inturned lip on the fourth side. A wireway plate extends over a portion of the main housing plate to define a wireway space in which the transformer, switch elements and wiring associated with the fluorescent lamp are located. The wireway plate seats flush against the three depending sides of the main housing plate and has an upstanding divider plate seating against the roof. A V-slot is defined along the dihedral edge of the divider plate and the wireway plate.

A pair of fluorescent lamp sockets are mounted in the fixture outside the wireway space. An L-shaped cover of diffusing flexible plastic is received in the V-slot and the inturned lip of the housing plate. This cover is inserted by flexing and in position spans out to anchor itself in position.

When it is desired to replace the fluorescent lamp, the operator need only depress the diffuser lip and remove the diffuser from the housing. The diffuser, because of its flexibility, will deform without damage and will spring back to its original shape. The reverse procedure is followed to reassemble the unit. With this construction a compact, self-contained fluorescent lamp fixture of shallow depth is achieved in which the lamp may be readily replaced.

It is therefore a general object of the present invention to provide a fluorescent lamp fixture which is shallow and self-contained.

It is yet another object of the present invention to provide a shallow fluorescent lamp fixture which has a flexible diffuser that is easily removed.

It is another object of the present invention to provide a shallow fluorescent lamp fixture having a main housing plate with one side forming a lip and a diffuser with one side having a lip whereby both lips register with one another when the fixture is assembled.

It is still another object of the present invention to provide a shallow fluorescent lamp fixture in which the electrical elements are confined in a self-contained wireway which also serves partly to secure the diffuser.

It is still a further object of the present invention to provide a fluorescent lamp fixture of rectangular cross section having a flexible diffuser which is easily removed to expose the lamp for replacement, a self-contained wireway isolating the electrical elements, the assembled fixture having a depth not greater than one inch.

It is yet a further object of the present invention to provide a shallow fluorescent lamp fixture which is compact in structure, neat and pleasant in appearance, low in cost to manufacture, adapted to house low wattage fluorescent lamps which may be readily replaced and which has a flexible diffuser which may easily be removed.

The novel features which I believe to be characteristic of my invention are set forth with particularity in the appended claims. My invention itself, together with further objects and advantages thereof will best be understood by reference to the following description taken in conjunction with the accompanying drawings in which:

Figure 1 is a perspective top plan view of a shallow fluorescent lamp fixture made in accordance with the present invention;

Figure 2 is an enlarged cross sectional view through axis 2—2, Figure 1;

Figure 3 is a top plan view of the fixture shown in Figure 1 with the diffuser removed;

Figure 4 is a top plan view of a diffuser made in accordance with the present invention;

Figure 5 is an enlarged cross sectional fragmentary view showing the joinder of the diffuser lip and the housing lip as shown in Figure 2; and Figure 6 is an enlarged cross sectional fragmentary view showing the interaction of the diffuser and the wireway as shown in Figure 2.

There is shown generally at 10, Figure 1, a shallow fluorescent lamp fixture made in accordance with the present invention. The fixture generally consists of main housing plate 12, wireway 14 and flexible diffuser 16. The main housing plate 12 and wireway 14 may be made of metallic or non-metallic material. A low wattage fluorescent lamp is located within the confines of the fixture 10 outside the wireway 14 and its light is diffused through diffuser 16. The entire unit is mounted in a manner such that the main housing plate 12 acts as a roof and the illumination of the lamp is downward. The lamp is readily replaced by disengaging diffuser 16 and removing the lamp which is situated directly above. After replacement of the lamp, the diffuser is engaged once again to make a complete unit.

The main housing plate 12 consists of a rectangular roof web 18 having 3 depending skirts 20, 22 and 24 which define the depth of the fixture. The main housing plate also has a depending inwardly turned lip 26 of limited extent on its fourth side. Lip 26 and diffuser 16 coact with one another in a manner that allows the fluorescent lamp to be readily replaced, as will be discussed in more detail hereinafter.

Wireway 14 consists of an elongated rectangular wireway plate 28 which fits flush against the three skirts 20, 22 and 24 of main housing plate 12. Skirts 20 and 24 are provided with ledges 20a and 24a which serve as mounts for wireway plate 28. The plate 28 is secured thereto by means of screws 30. Wireway plate 28 has an upturned skirt 32 of limited extent as shown in Figure 2, which rests against skirt 22 of main housing plate 12. The leading edge 34 of wireway plate 28 is provided with a divider plate 36 which is affixed thereto by welding or similar means and which extends upward to termniate against roof web 18. Divider plate 36 is bent upwardly at 38 to define a V-slot 40 between the bent portion 38 and wireway plate 28. The leading edge of the diffuser 16 is received in V-slot 40 as will be described in more detail hereinafter.

The bottom surface 28a of wireway plate 28 is provided with an electrical socket element 42 which receives the outside source of electric energy (not shown) and with switch element 44 which energizes and deenergizes the fluorescent lamp. It is to be understood that the disposition of the socket and switch form no part of the present invention.

As shown in Figure 2, wireway 14, when it is mounted on housing plate 12, forms a wireway space which completely encloses the electrical elements used in the fixture except the fluorescent lamp. Some of these elements include transformer 46 and wires 48 leading to the fluorescent lamp. In this manner, the fixture 10 is neatly compartmentalized, preventing stray electrical elements from interfering with the light cast from the lamp and also reduces fire hazard by confining these electrical elements.

Referring now to Figures 2, 4, and 5, diffuser 16 has an L-shaped conformation defining a diffuser plate 50 and an upturned side 52. Diffuser 16 is made of flexible material such as plastic so that it will return to its molded position after being deformed. The top edge of side 52 has a lip 54 which is outturned and extends generally in the downward direction. The lip 54 is of very limited extent and acts as a lock when registered in lip 26 of roof web 18. As best seen in Figure 5, lip 26 is turned inwardly and lip 54 is turned outwardly, thereby locking each other in position when in register.

As best seen in Figure 6, the leading edge 56 of diffuser 16 is received in V-slot 40 which is the space defined between divider plate 36 and wireway plate 28. Accordingly, the V-slot 40 and housing lip 26 provide a mount for diffuser 16 which eliminates nuts and bolts or the use of similarly awkward securing elements.

The fluorescent lamp 58, which is located within the confines of fixture 10 but outside of wireway 14, will pass its light through diffuser 16. The lamp 58, which is of low wattage, is mounted in socket elements 60 which are secured to skirts 20 and 24 of main housing plate 18 by screws 62 as is best seen in Figure 3. To replace the lamp, it need only be rotated 90° about its longitudinal axis and removed from the socket elements.

If after the lamp fixture is mounted it is desired to replace fluorescent lamp 58, the user need only flex lip 54 of diffuser 16 inwardly to clear housing lip 26. When the diffuser lip 54 is out of register with housing lip 26, the leading edge 56 is removed from V-slot 40. The fixture 10 will appear as shown in Figure 3.

To reassemble the fixture, the opposite procedure is followed. Leading edge 56 is inserted in V-slot 40 and diffuser lip 54 is flexed inwardly to again clear housing lip 26. When this occurs, the elastic property of the diffuser will allow the lip 54 to return to its molded form locking the diffuser in place.

It will be noted that only diffuser 16 need be removed in order to expose and replace fluorescent lamp 58.

With the above construction, a shallow fluorescent lamp fixture in which lamps are readily and easily replaced is achieved. As is now constructed, the depth of the fixture does not exceed one inch and the entire unit presents a compact, an attractive and pleasing appearance.

While I have shown and described specific embodiments of the present invention it will, of course, be understood that many modifications and alternative constructions may be made without departing from the true spirit and scope thereof. I therefore intend by the appended claims to cover all such modifications and alternative constructions falling within their true spirit and scope.

What I claim as new and desire to secure by Letters Patent of the United States is:

1. A shallow fluorescent lamp fixture comprising in combination: a main metallic housing plate defining a rectangular roof web and depending skirts along three sides of the roof web, the main housing plate also defining a shallow inwardly turned depending lip along its fourth side; an elongated metallic wireway plate secured to the main housing plate flush with the skirt thereof on the side opposite to the fourth side, the wireway plate having a divider plate secured to its inboard edge and curving upwardly to the roof web to define a closed elongated wireway space and a V-slot along the inboard edge of the wireway plate; fluorescent lamp socket elements disposed within the confines of the main housing plate and outside the wireway space; and a diffuser formed of flexible material having an L-shaped conformation with one edge fitting into the V-slot and the opposite edge having a shallow outturned lip which registers under the lip of the main housing plate, the diffuser serving to define a complete shallow fluorescent lamp fixture of rectangular cross-section and having sufficient flexibility to permit removal by flexing the lip inwardly to clear the housing lip.

2. A shallow fluorescent lamp fixture comprising in combination: a main housing plate defining a rectangular roof web having depending skirts along three sides thereof and an inwardly turned lip of limited extent along the fourth side of said main housing plate; an elongated wireway plate secured to the main housing plate flush with the three skirts thereof to define a wireway space adapted to contain electrical elements; fluorescent lamp socket elements disposed within the confines of the main housing plate and outside the wireway space; and a diffuser formed of flexible material having an L-shaped conformation with the leading edge fitting under the wireway plate and the opposite edge having a shallow outturned lip which registers under the lip of the main housing plate, the diffuser serving to define a complete shallow fluorescent lamp fixture of rectangular cross-section and having sufficient flexibility to permit removal by flexing the lip inwardly to clear the housing lip.

References Cited in the file of this patent
UNITED STATES PATENTS

| | | |
|---|---|---|
| 2,348,930 | Schepmoes | May 16, 1944 |
| 2,578,190 | Kurtzon | Dec. 11, 1951 |
| 2,596,634 | Wince | May 13, 1952 |
| 2,864,939 | Bodian | Dec. 16, 1958 |